United States Patent

Allison et al.

[11] Patent Number: 5,917,900
[45] Date of Patent: Jun. 29, 1999

[54] REMOTE DATA GATEWAY

[75] Inventors: Jeffrey E. Allison, Burke, Va.; Christine S. Chaney, Colorado Springs; Adam David Mermel, Monument, both of Colo.; Frances D. E. Taylor, Falls Church, Va.

[73] Assignee: MCI Communications Corporation, Washington, D.C.

[21] Appl. No.: 08/796,246

[22] Filed: Feb. 7, 1997

[51] Int. Cl.⁶ .............................. H04M 7/00; H04M 15/00
[52] U.S. Cl. .................... 379/220; 379/113; 379/133; 379/230
[58] Field of Search .................................. 379/219, 220, 379/221, 207, 230, 111, 112, 113, 115, 133, 134, 269, 229

[56] References Cited

U.S. PATENT DOCUMENTS

| | | | |
|---|---|---|---|
| 4,953,204 | 8/1990 | Cuschleg, Jr. et al. | 379/266 |
| 5,537,611 | 7/1996 | Rajagopal et al. | 379/207 X |
| 5,787,160 | 7/1998 | Chaney et al. | 379/220 |
| 5,787,163 | 7/1998 | Taylor et al. | 379/221 X |

OTHER PUBLICATIONS

Data Communications Technical Reference, TR 54022, "AT&T Intelligent Call Processing (ICP) Service, Signaling System No. 7 Network Interface Specification," Nov., 1991.

*Primary Examiner*—Harry S. Hong

[57] ABSTRACT

A system and method for permitting a customer to perform intelligent call routing (ICR) in a carrier's network. A Remote Data Gateway (RDG) permits customers to control the routing of their call traffic on the carrier's network. The RDG provides the routing and delivery of call processing queries, generated on the carrier's network, to a Customer Access Point (CAP). The customer can use the CAP to perform ICR and other call processing functions. The results are sent as a response back to the RDG, which delivers the response to the carrier's network for implementation. Features provided by the RDG include improved security, improved service reliability, message and protocol translation, and maximum efficiency of network and system resources through a dynamic registration process.

8 Claims, 7 Drawing Sheets

REMOTE DATA GATEWAY

CROSS-REFERENCE TO RELATED APPLICATIONS

This application is related to commonly-owned, applications filed concurrently herewith, entitled "System and Method for Call Park and Transfer in a Telecommunications Network" having application Ser. No. 08/796,840, filed on Feb. 7, 1997, and "Network Call Parking Manager" having application Ser. No. 08/796,839, filed on Feb. 7, 1997, which are incorporated herein by reference in their entirety.

BACKGROUND OF THE INVENTION

1. Field of the Invention

The present invention relates generally to computer telephony, and more particularly to call routing on a telephone network.

2. Related Art

Telecommunications network carriers perform intelligent call routing (ICR) to provide a high level of control over the routing of calls. ICR can be used to determine the destination of a call (that is, the point of call termination) based on one or more criteria, including dialed number, Dialed Number Identification Service (DNIS), calling number, Automatic Number Identification (ANI), point of call origination, point of call termination, time of day, day of week, caller-MCI entered digits, etc. ICR can also perform load balancing to route calls to one of a plurality of possible destinations on a call-by-call basis. Load balancing can be based on a number of criteria, including termination availability, random selection, round-robin, and the like.

Because ICR provides extensive control over the processing and routing of calls, many customers of carriers desire to perform their own ICR. One conventional approach to implementing customer ICR requirements is to incorporate the call routing features desired by the customer directly within the carrier's network. This approach suffers from two significant drawbacks. First, customer-specific features implemented within one carrier's network are generally not portable to another carrier's network. Second, this approach requires the customer to provide proprietary call data to the carrier for implementation. A customer's proprietary call data can include information such as lists and profiles of its customers. For security reasons, many customers will not provide this sensitive data.

In another conventional approach, the carrier simply provides a communications interface between the customer and the carrier's ICR systems and network. This approach also suffers from two significant drawbacks. First, this approach does not provide adequate security for the carrier. A customer, or any other user who gains access to the communications interface, can cause significant harm to the carrier network. Second, this approach has limited resistance to failures. Such an interface is limited to the network and system redundancy provided by the ICR system.

What is needed, therefore, is a way to permit customers of a carrier to perform ICR on calls in the carrier's network without jeopardizing the security of the carrier's network.

SUMMARY OF THE INVENTION

A system and method for permitting a customer to perform intelligent call routing (OCR) in a carrier's network. The system includes a remote data gateway coupled between a carrier's data access point (DAP) and a customer's access point (CAP). The method includes the steps of receiving a call processing query from the DAP, translating the call processing query from the carrier's message format and protocol to the customer's message format and protocol, and sending the translated call processing query to the CAP. The customer can then perform ICR by processing the translated call processing query to create a call processing response.

The method further includes the steps of receiving the call processing response from the CAP, translating the call processing response from the customer's message format and protocol to the carrier's message format and protocol, and sending the translated call processing response to the DAP. The DAP then uses the translated call processing response to route the call.

One advantage of the present invention is that it improves the security of the carrier network by isolating the customer from the carrier's network and authenticating messages from the customer.

Another advantage of the present invention is that it improves the reliability of gateway services by providing increased redundancy.

Another advantage of the present invention is that it improves ICR efficiency by monitoring the status of links between the customer and carrier Another advantage of the present invention is that it ensures that calls are handled in a timely manner through the use of timers and default routing.

BRIEF DESCRIPTION OF THE FIGURES

The present invention will be described with reference to the accompanying drawings, wherein.

DETAILED DESCRIPTION OF THE PREFERRED EMBODIMENTS

Intelligent Call Routing (ICR) provides extensive control over the processing and routing of calls. For this reason, many customers of carriers desire to perform their own ICR. The present invention permits customers to do so without jeopardizing the security of the carrier's network.

Overview

In a preferred embodiment of the present invention, a customer provides the carrier with a call processing plan for each type of call to be processed. Call types include special area code numbers like 800 and 900, virtual private network numbers, calling card numbers, and the like. Calls are processed according to call processing plans in a Data Access Point (DAP). In a preferred embodiment, a DAP is a computer processing platform that performs ICR functions for the carrier's switched network.

If a customer wishes to perform ICR for a certain type of call, a "trigger point" is inserted in the call processing plan. A trigger point is a conditional branch, as would be apparent to one skilled in the relevant art. When an active trigger point is encountered in a call processing plan during call processing at a DAP, a call processing query is created and sent to the customer. The customer then performs ICR processing on the call processing query to create a call processing response, which is sent to the DAP that originated the call processing query. The DAP uses the contents of the call processing response to route the call.

If the link between the DAP and the customer is unavailable, the trigger point is inactivated, and default call routing is used. Default call routing is also used if a trigger point is active, but no call processing response is received from the customer. Default call routing is typically specified by the customer when the call processing plan is created.

If a customer had direct access to a DAP, the customer would have the potential to cause significant harm to the carrier's network. For this reason, the present invention provides a gateway, called the remote data gateway (RDG), between the DAP and the customer's point of presence, which is called the customer access point (CAP).

By isolating the DAP from the customer, the RDG provides security for the carrier, as described below. The RDG provides many layers of security to ensure only authorized customers have access to a carrier's ICR systems and network. Security is provided at the network level, the system level, and the application level. Further, when multiple DAPs and RDGs are interconnected with a CAP, a high degree of resistance to failure is provided.

The RDG provides an improvement in the reliability of customer gateway services by providing additional layers of redundancy. Redundancy is realized in the use of multiple RDGs, interconnectivity among RDGs that is redundant to interconnectivity among a carrier's ICR sites, and redundant connectivity from RDGs to CAPs.

The use of a CAP allows a customer who has traditionally relied on a single carrier to begin porting percentages of their traffic to other carriers without having to provision and support that newly ported traffic using a separate set of network management equipment. Of course, customers may have other reasons for performing their own ICR.

The RDG provides message format and communications protocol translation for many types of formats and protocols. CAPs may use standard messaging formats, such as Abstract Syntax Notation One (ASN.1), and standard communications protocols, such as Transport Control Protocol/internet Protocol (TCP/IP) or User Datagram Protocol/Internet Protocol (UDP/IP), to interface with a carrier's internal ICR system, which may use carrier-proprietary messaging formats and protocols. Of course, other messaging formats and protocols can be employed without departing from the spirit and scope of the present invention. In one embodiment, the RDG can serve as a customer gateway to an SS7 network by providing message translation to SS7 messages.

The RDG employs a dynamic registration process that maximizes the efficiency of network and system resources by ensuring that call processing queries are transmitted only when and where they can be used. The status of a CAP and links to that CAP are monitored by the RDGs. Only RDGs that are actively connected to a CAP will receive queries from the ICR system to send to the CAP.

An RDG can also be used to route call processing queries to other ICR components of a carrier. A carrier may employ an in-network Service Control Point (SCP) or other sort of enhanced call router to perform ICR functions or services not covered by the standard ICR system. The RDG can be used as a common interface to a carrier's ICR system for both CAPs and these in-network SCPs.

Example Environment

Figure 1:
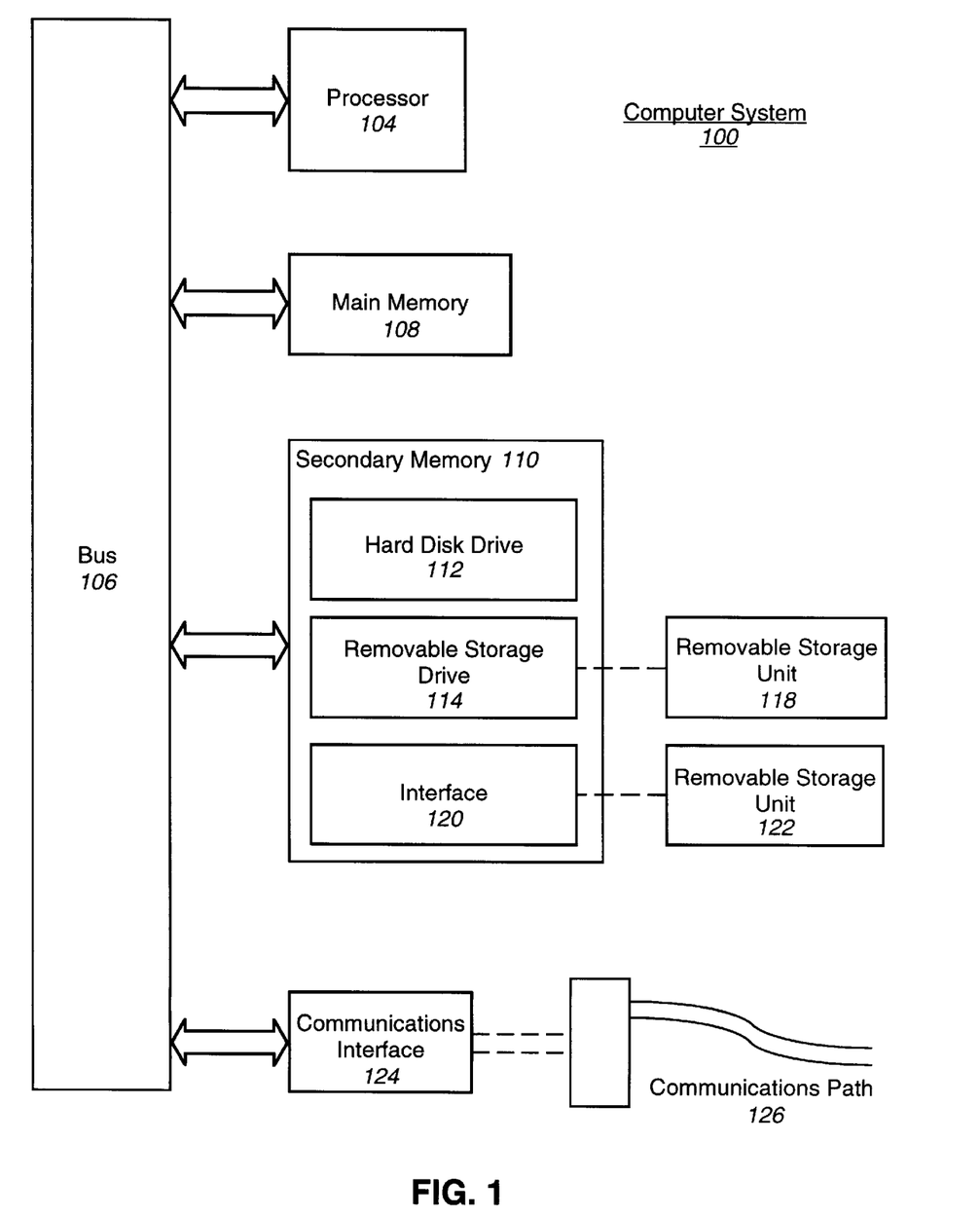
FIG. 1 is a block diagram illustrating an example environment in which the present invention can operate.

Before describing the operation of the present invention in detail, it is useful to first describe an exemplary environment in which the present invention can operate. FIG. 1 is a block diagram illustrating such an example environment. Computer system 100 includes one or more processors, such as processor 104. The processor 104 is connected to a communications bus 106. Various embodiments are described in terms of this example computer system. After reading this description, it will be apparent to a person skilled in the relevant art how to implement the present invention using other tables, and the like, and various combinations thereof.

Computer system 100 also includes a main memory 108, preferably random access memory (RAM), and can also include a secondary memory 110. The secondary memory 110 can include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means can include, for example, a removable storage unit 122 and an interface 120. Examples can include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100.

Computer system 100 can also include a communications interface 124. Communications interface 124 allows software and data to be transferred between computer system 100 and external devices through communications path 126. Examples of communications interface 124 can include a modem, a network interface (such as an Ethernet card), a communications port, etc. Software and data transferred through communications interface 124 are in the form of signals which can be electronic, electromagnetic, optical or other signals capable of being received by communications interface 124 through communications path 126.

The present invention is described in terms of this example environment. Description in these terms is provided for convenience only. It is not intended that the present invention be limited to application in this example environment. In fact, after reading the following description, it will become apparent to a person skilled in the relevant art how to implement the present invention in alternative environments.

Example Embodiments

Figure 2:
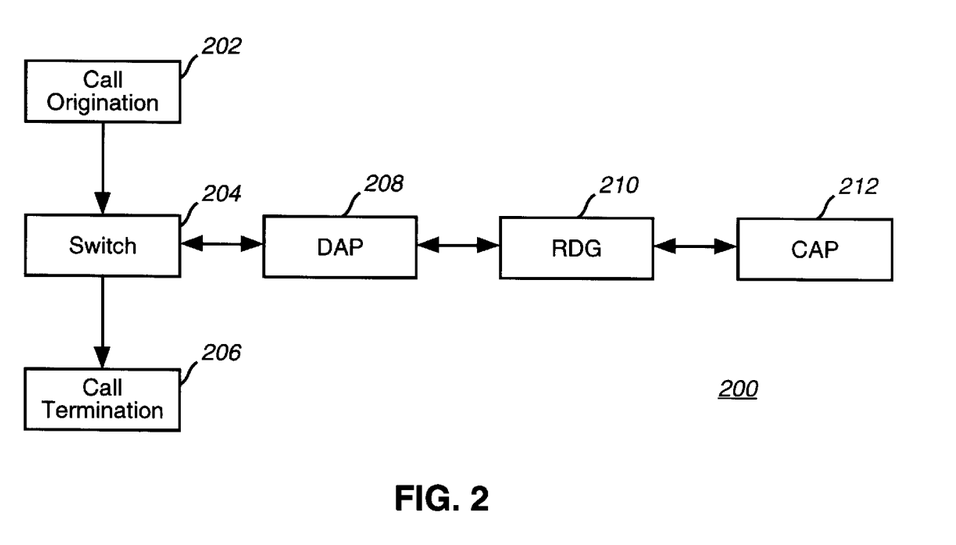
FIG. 2 is a block diagram illustrating an example use of the present invention in a telecommunications network.

FIG. 2 is a block diagram illustrating an example use of the present invention in a telecommunications network 200. Telecommunications network 200 includes a point of call origination 202, a switch 204, a point of call termination 206, a DAP 208, an RDG 210, and a CAP 212.

CAP 212 provides an access point to network 200 for a customer who desires to perform ICR for certain calls. In a preferred embodiment, CAP 212 is a computer processing platform that has a data communications network interface and is capable of receiving, processing, and sending data messages.

A call on network 200 originates at a point of call origination 202. The switch 204 identifies the call, based on the dialed number and possibly the Automatic Number Identification (ANI), as one requiring ICR processing. The switch 204 then sends a call processing query to DAP 208, which represents the carrier's ICR system.

In a preferred embodiment, DAP 208 is a computer processing platform that performs ICR functions for the carrier's switched network. In standard processing, in which a CAP 212 does not perform ICR, the DAP 208 processes the query to determine the routing for the call (that is, how the call should be routed through the network). The DAP 208 may also perform other functions, such as calling card authorization, as would be apparent to one skilled in the relevant art. The DAP 208 then sends the switch 204 a carrier call processing response that specifies the routing for the call.

Figure 3:
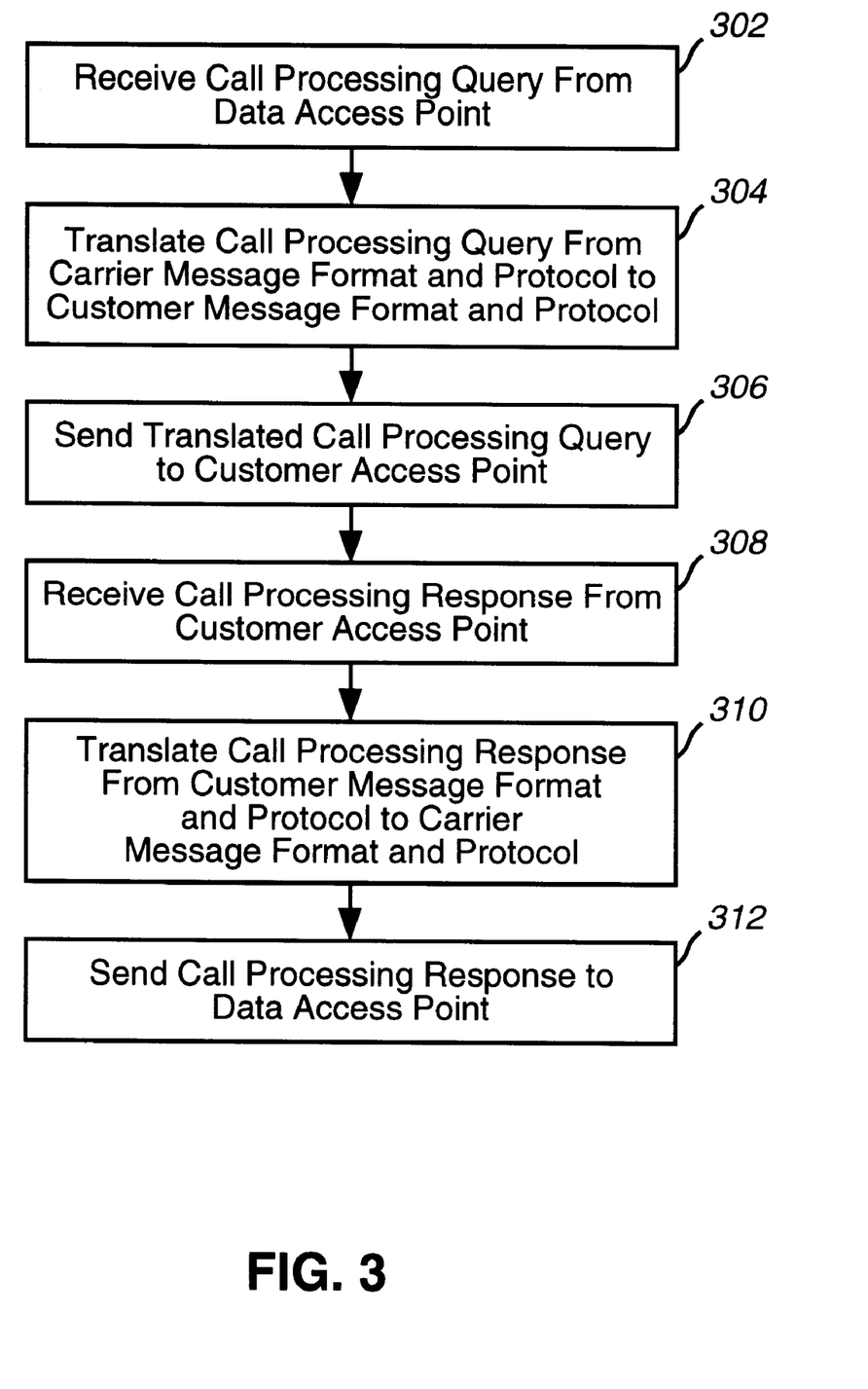
FIG. 3 is a flowchart illustrating an example operation of the present invention in processing a call processing query, and the ensuing response, according to a preferred embodiment.

If the customer of the call has requested to perform the ICR for the call, then DAP 208 formulates a call processing query and sends the query to RDG 210. FIG. 3 is a flowchart illustrating an example operation of an RDG in processing the query, and the ensuing response, according to a preferred embodiment. RDG receives the call processing query from DAP 208, as shown in a step 302. RDG 210 translates the message from the protocol and message format that is used by the carrier to the protocol and message format that is used by the customer, as shown in a step 304. The RDG 210 then sends the translated call processing query to the appropriate CAP 212 for ICR processing by the customer, as shown in a step 306.

The CAP 212 processes the query in accordance with the customer's requirements to determine a specific network destination for the call. This destination is returned to RDG 210 in a call processing response. RDG 210 receives the call processing response, as shown in a step 308, and translates the protocol and message format from those used by the customer to those used by the carrier, as shown in a step 310. The RDG 210 then sends the translated call processing response to the DAP 208 that issued the call processing query, as shown in a step 312.

The DAP 208 then performs any translation of the CAP's response that is needed to specify an exact network address, and sends that network address in a message to switch 204. Switch 204 then routes the call, via one or more further switches in the network, to a point of call termination 206 specified by the network address.

Figure 4:
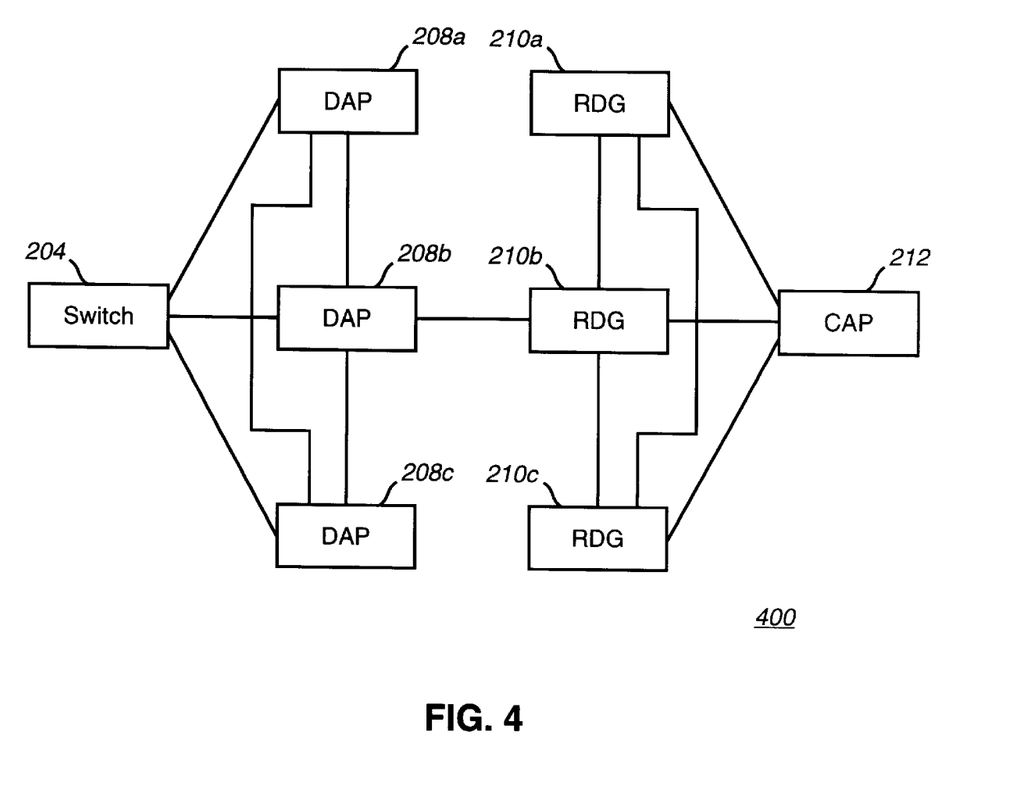
FIG. 4 illustrates an example configuration of the present invention according to a preferred embodiment.

A plurality of RDGs can be logically interconnected with one or more DAPs and CAPs to provide a high degree of redundancy. FIG. 4 illustrates an example arrangement 400 according to a preferred embodiment of the present invention. This arrangement provides several layers of redundancy in connectivity for ensuring that call processing queries reach CAP 212, and that responses from the CAP 212 reach switch 204. In the arrangement of FIG. 4, an RDG 210 is co-located with each of three DAPs 208. A customer can employ multiple CAPs for redundancy. In one embodiment, each of the multiple CAPs performs call routing. In another embodiment, one or more CAPs are configured as hot backups for one or more CAPs. Other arrangements of DAPs, RDGs, and CAPs can be employed without departing from the spirit and scope of the present invention, as would be apparent to one skilled in the relevant art.

In a preferred embodiment, a switch 204 in a carrier's network is connected via dual X.25 links to each of three DAPs 208, for a total of six DAP links per switch. For each call processing query created by a switch, a random or round-robin method can be used to determine to which DAP 208 the query should be sent. In a preferred embodiment, the translated call processing query sent to a CAP contains an identifier for the RDG sending the query, and the CAP sends the corresponding call processing response to that RDG.

The three RDGs 210 are all connected to each other, so that queries to and responses from a CAP 212 may be sent from one RDG 210 to another if necessary. The RDG 210 that is local to the DAP 208 is the primary RDG 210 for that DAP. For example, RDG 210a is the primary RDG for DAP 208a. The other two RDGs 210 are used as backup RDG for that DAP. A CAP 212 can be linked to one or more RDGs 210, as desired by the customer. In a preferred embodiment, a CAP 212 is linked to at least two RDGs 210.

This logical architecture provides several layers of redundancy in the event that any component or communications link fails. If a link between a DAP 208 and its local RDG 210 fails, or if the local RDG 210 fails, the DAP 208 can route a query to another RDG 210 via links between DAPs 208. If a link between an RDG 210 and a CAP 212 fails, the RDG 210 can route a query to the CAP 212 via another RDG 210. The CAP 212 can route responses to an RDG 210 via its direct link to that RDG 210, or via another RDG 210. The configuration shown in FIG. 4 is exemplary. One skilled in the art will readily appreciate the other numerous configurations for connecting a plurality of DAPs, RDGs and CAPs.

Figure 5:
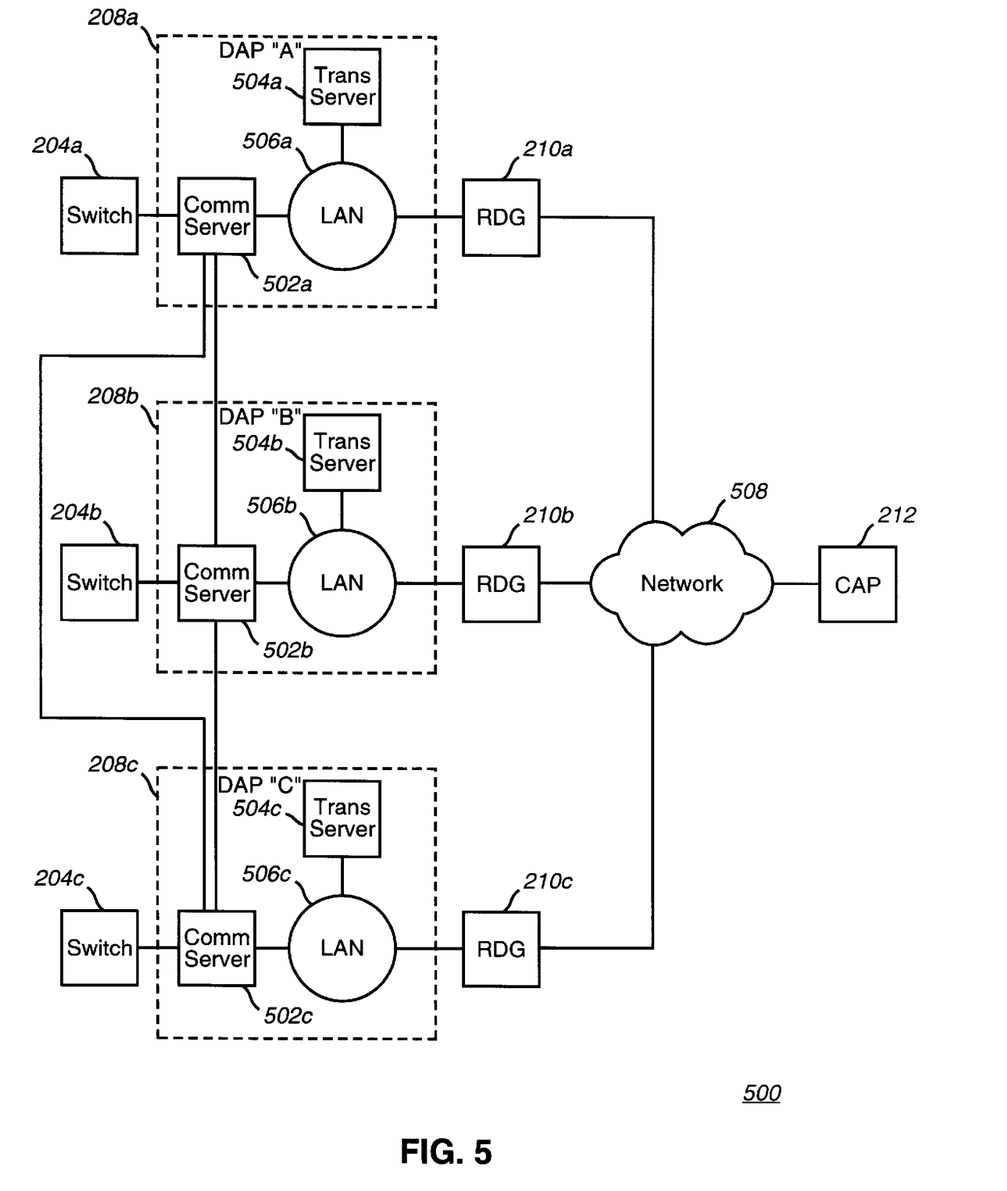
FIG. 5 illustrates an example implementation of the present invention according to a preferred embodiment.

FIG. 5 illustrates an example implementation of the logical architecture shown in FIG. 4 according to a preferred embodiment. In this architecture, each DAP 208 includes at least one communications server 502 and at least one transaction server 504 connected to a local area network (LAN) 506. In a preferred embodiment, LAN 506 is a Fiber Distributed Data Interface (FDDI) ring. The architecture is scalable, as would be apparent to one skilled in the relevant art.

Each DAP 208 is connected to its primary RDG 210 by LAN 506. In one embodiment, a plurality of RDGs 210 are provided at each DAP 208 site. In a preferred embodiment, there is one primary RDG 210 at each DAP 208, and one backup RDG 210. These are configured in hot cutover mode so that if the primary RDG 210 fails, the backup RDG 210 can immediately take over.

In a preferred embodiment, each switch 204 is connected to a DAP 208 by a dual X.25 link. In a preferred embodiment, each DAP 208 is also connected to two other DAPs 208 via links among the communications servers 502. When a switch 204 issues a call processing query to a DAP 208, the query is received as a message by the communications server 502. The communications server 502 then routes the message via the LAN 506 to the transaction server 504. Communications servers and transaction servers are well-known in the art. The transaction server 504 performs call processing on the query. Call processing includes executing a call processing plan to determine the routing for a call, as would be apparent to one skilled in the relevant art. In one embodiment, call processing is accomplished by executing software on transaction server 504.

If the customer of the call wants to perform the ICR for the call, a trigger is placed in the call processing plan for the call. When such a trigger is reached during call processing for a call, the transaction server 504 sends the query, via the LAN 506, to the RDG 210.

In a preferred embodiment, DAP 208 is a Digital Equipment Corporation (DEC) Alpha platform running Virtual Memory System (VMS) for the communications server 502 and transaction server 504. DECNet routing is used as the carrier protocol for routing messages over the LAN 506. These messages typically use a carrier-proprietary message format.

RDG 210 converts the call processing query from the message format and protocol that was used by the transaction server 504 over the LAN 506 to the message format and protocol that is used to send the message to the CAPs 212. The use of two different protocols and message formats forms a "firewall" between the customer and the carrier's network, thus allowing the customer to control call routing while protecting the carrier's network.

In a preferred embodiment, RDG 210 extracts the query application data from the carrier-proprietary message format, and creates an ASN.1 message. ASN.1 is a common message format, as is well-known in the art. In a preferred embodiment, ASN.1 is used for communications between RDG 210 and CAPs 212. However, other message formats and communications protocols can be employed, as would be apparent to one skilled in the relevant art. RDG 210 sends the ASN.1 message to the CAP 212 over a network 508. In a preferred embodiment, network 508 employs Internet Protocol (IP). In a preferred embodiment, the RDG 210 sends messages to the CAP 212 using UDP over the network 508.

In a preferred embodiment, a time budget of 500 ms is established for sending a customer query to a CAP 212, CAP processing, and receiving responses back from the CAP 212. Other time budgets can be established, as would be apparent to one skilled in the relevant art. Therefore, the RDG 210 sets a timer of 500 ms when it sends a call processing query to the CAP 212.

Figure 6:
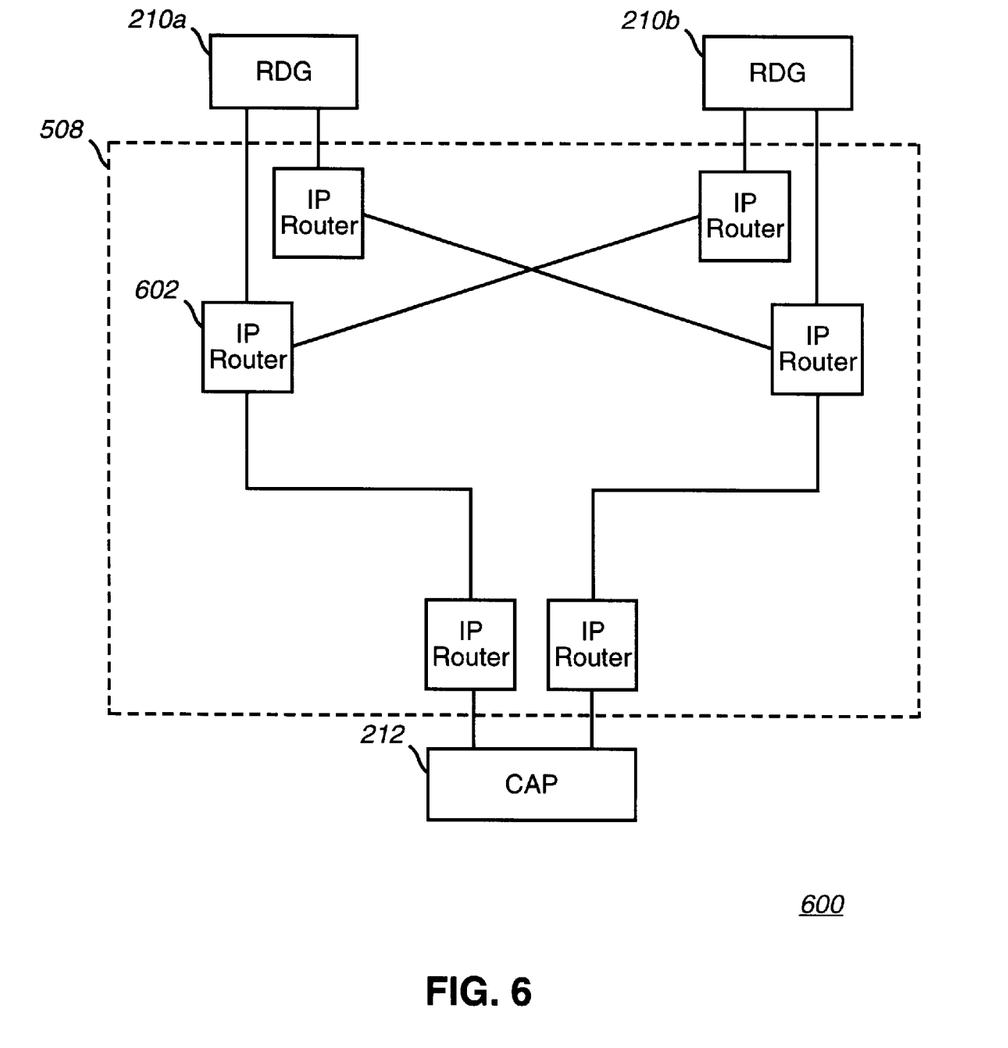
FIG. 6 illustrates an example implementation of a network configuration according to a preferred embodiment.

In a preferred embodiment, network 508 is an IP network that provides redundant connectivity between each CAP 212 and the RDGs 210. Network 508 also provides connectivity among the three RDGs 210, thereby providing another layer of redundancy. FIG. 6 illustrates an example implementation of network 508 according to a preferred embodiment. This implementation also provides network-based security for the carrier, as described below.

FIG. 6 shows a configuration of two RDGs 210. In a preferred embodiment, a third RDG 210 (not shown) is connected to each of the illustrated RDGs 210 in same way. FIG. 6 also shows a configuration of one CAP 212. In a preferred embodiment, each CAP 212 that is supported is connected in the same way. Each RDG 210 and each CAP 212 uses two IP routers 602 for redundancy. This provides the CAP 212 with two logical paths to each RDG 210.

Figure 7:
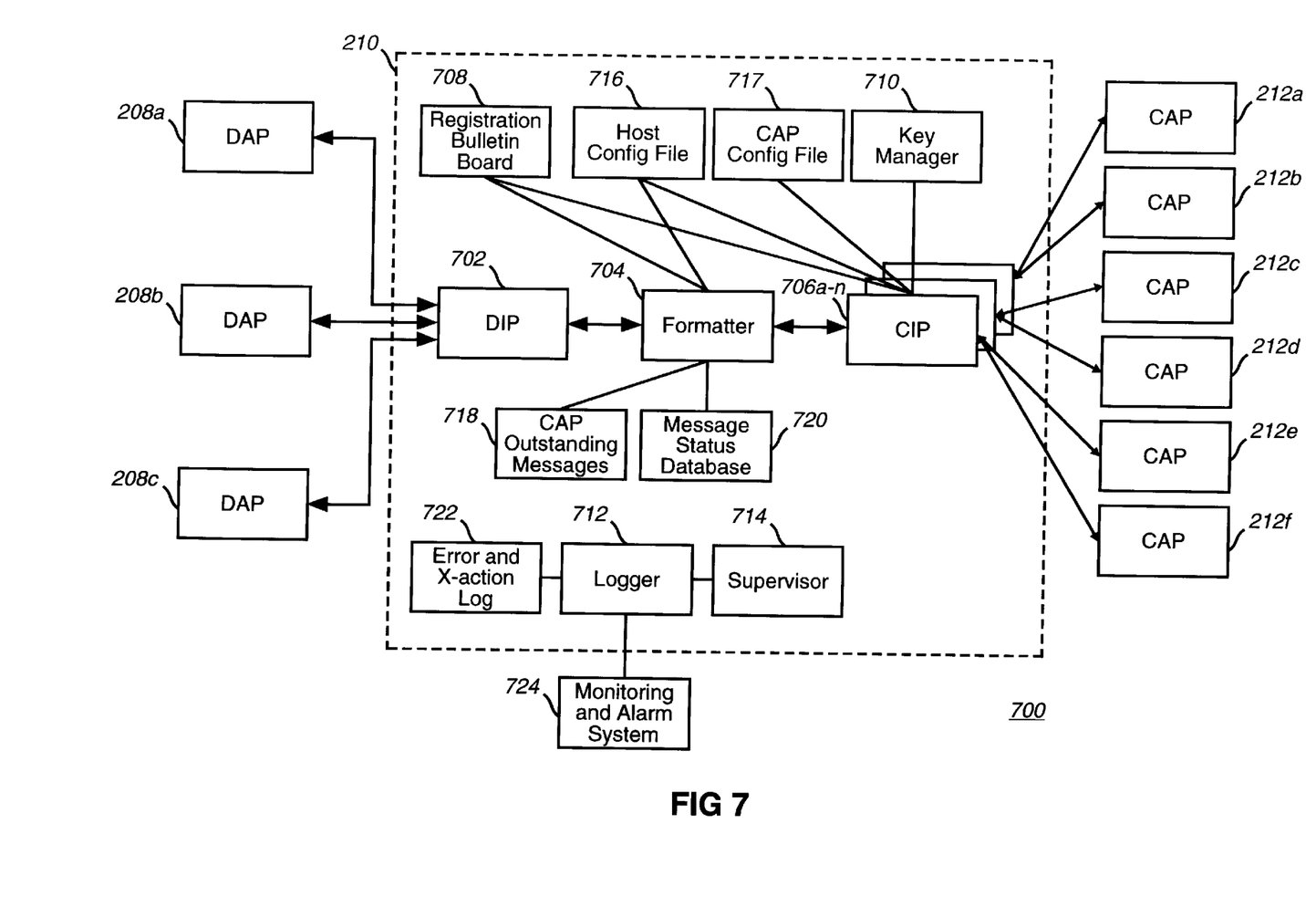
FIG. 7 is a block diagram illustrating an example internal logical architecture for the remote data gateway of the present invention, according to a preferred embodiment.

FIG. 7 is a block diagram illustrating an example internal logical architecture for RDG 210, according to a preferred embodiment. In one embodiment, RDG 210 is realized on a DEC Alpha 2100 system running VMS, and VMS mailboxes are used for interprocess communications within the RDG 210.

RDG 210 includes a DAP interface process (DIP) 702. DIP 702 is a communications manager that is responsible for managing the communications links between RDG 210 and DAPs 208. This management includes monitoring and alarming functions, as would be apparent to one skilled in the relevant art. DIP 702 exchanges messages with DAPs 208 in a carrier-proprietary message format and protocol. DIP 702 receives carrier call processing queries from DAPs 208 and passes them to a formatter 704. DIP 702 also receives call processing responses from formatter 704 and sends them to the appropriate DAPs 208.

When formatter 704 receives a call processing query, it extracts the application data from the query. Application data can include the call processing query itself, the dialed number of the call, a customer identification code, ANI of the caller, and a trigger point identifier, etc. Trigger point identifiers are used in a dynamic registration process, as described below. The formatter 704 then builds an ASN.1 message using the application data, and sends the message to a CAP Interface Process (CIP) 706 via VMS mailbox.

A CIP 706 is a communications manager that provides the RDG 210 interface to the CAPs 212. For the purpose of load balancing, there are multiple instances of the CIP 706 in a preferred embodiment, each supporting one or more CAPs 212. While there may be many CAPs 212 supported by one CIP 706, there is only one CIP 706 for each CAP 212. Each CIP 706 manages its links with CAPs 212. Each CIP 706 also sends query messages to, and receives response messages from CAPs 212. The CIP 706 also performs an authentication process on messages received from CAPs 212, as described below.

Alternative Embodiments

The RDG 210 can also be used to provide data gateway services for other ICR components of a carrier, in addition to CAPS. For example, a carrier may employ an in-network Service Control Point (SCP) that performs ICR for special services not covered by the DAP 208.

The specification of the RDG 210 as an interface between ASN.1 messages over an IP network and generic proprietary messages over a DECNet network is used as an example. The formatter 704 and the DIP 702 can be replaced by similar components to use the RDG 210 as an interface between networks using virtually any type of communications messaging and protocol.

For example, the carrier may perform ICR functions using components other than DAP 208. Generally, these components are co-located with the DAP 208 and the RDG 210. Thus in one embodiment, the communications between the RDG 210 and other ICR components employs the TCP/IP protocol and transaction capability action part (TCAP) message format. The RDG 210 can format queries received from the DAP 208 into TCAP messages, and send to other ICR components and even CAPs 212 using TCP/IP. TCAP is a message format commonly used in Signaling System 7 (SS7), as is well-known in the art.

For another example, the RDG 210 can serve as a customer (CAP 212) interface to an SS7 network. The DIP 702 receives queries as TCAP messages from a Service Control Point (SCP) of an SS7 network. The formatter 704 then extracts the application data and builds a message in whatever format is used by the CAP 212. The RDG 210 then sends the message to the CAP 212 using TCP/IP, UDP/IP, or any other communications protocol that is needed.

Dynamic Service Registration

As described above, a call processing plan can contain one or more trigger points. In a preferred embodiment, each trigger point has two states: "active" and "inactive." When an active trigger point is encountered in a call processing plan, a query is sent to the customer associated with the trigger point. The query is a request for call routing instructions. When an inactive trigger point is encountered in a call processing plan, the default routing specified by the customer is used. Trigger point status is updated by a process referred to as "dynamic service registration."

In a preferred embodiment, a registration bulletin board 708 is provided to track the status of gateway services provided by RDG 210 to CAPs 212. Registration bulletin board 708 contains identifiers for the trigger points for the CAPs serviced by RDG 210. These identifiers are called "trigger point identifiers."

When a RDG 210 establishes a link to a CAP 212, the states of the trigger point identifiers for the trigger points belonging to the CAP 212 are changed to "active" in registration bulletin board 708. When a trigger point identifier is activated in the registration bulletin board 708, formatter 704 sends a message to the DAP 208 to register that trigger point identifier at the DAPs 208 that it services. The DAP 208 registers a trigger point identifier by activating the corresponding trigger point in the call processing plans that include that trigger point.

For each call type, the DAP 208 has a call processing plan that specifies how those calls are to be handled. If a customer has requested that calls for a particular call type be processed by their CAP 212, then the DAP 208 will place a trigger point in its call processing plan for that particular call type. When a message from the formatter 704 is received to register the trigger point, the DAP 208 activates the trigger point for that customer and call type.

When a call processing query for a call type is sent from the switch 204 to the DAP 208, the DAP 208 performs the call processing plan for that call type. When DAP 208 reaches the trigger point in the call processing plan, it determines whether it has been registered and, if so, by what RDG 210. The DAP 208 then sends a call processing query message to the RDG 210 that registered the trigger point.

In a preferred embodiment, one of two methods can be used by the DAP 208 to send a query message to an RDG 210 based on reaching a trigger point. Both methods take advantage of the fact that routing queries to a DAP's local RDG is less expensive in terms of network costs than routing queries to a remote RDG. Both methods also take advantage of the redundancy provided by the interconnectivity among the DAPs and the interconnectivity among the RDGs.

In one embodiment, when the DAP 208 reaches a trigger point in call processing, it first determines whether a trigger point identifier has been registered in that DAP. If so, then the DAP 208 determines whether the trigger point identifier was registered by the local RDG 210. If so, the DAP 208 sends the query to the local RDG 210. If not, the DAP 208 then determines whether the trigger point identifier was registered by another RDG 210. If so, the DAP 208 sends the query there. A CAP 212 may use more than one RDG 210, and therefore may register a trigger point identifier with more than one RDG 210. The DAP 208 first checks for registration with its local RDG 210, since routing messages to it will be the least expensive in terms of network costs.

In an alternative embodiment, when the DAP 208 reaches a trigger point in call processing, it first determines whether a trigger point identifier has been registered with that DAP. If so, instead of first determining whether the trigger point was registered by its local RDG 210, the DAP 208 automatically sends the query to its local RDG 210. If the state of the trigger point identifier is active in the registration bulletin board 708 of the local RDG 210, then the local RDG 210 processes the query. If the state of the trigger point identifier is not active in the registration bulletin board 708 of the local RDG 210, then the local RDG 210 sends the query to another RDG 210. Other methods of locating an RDG 210 where the state of the trigger point is active can be employed without departing from the spirit and scope of the present invention, as would be apparent to one skilled in the relevant art.

If a CAP 212 does not establish a link to an RDG 210, then the trigger point identifiers associated with the CAP's trigger points are not active for that RDG. Therefore, none of the CAP's trigger points are registered with the DAPs serviced by the RDG, and so no trigger points for that CAP are active in the customer's call processing plan at those DAPs. If a trigger point is not active, then the DAP 208 will use default routing and will send a response directly back to the switch 204. Default routing is specified by the customer when ordering gateway service, as would be apparent to one skilled in the relevant art.

This dynamic registration process ensures that only RDGs 210 with a link to a CAP 212 will receive and route queries to that CAP 212. It also ensures that the RDG 210 that is local to the DAP 208 is the first to receive the query if it registered with the DAP, via one of the two methods described previously.

If a link from an RDG 210 to a CAP 212 is disestablished (for example, goes down), that RDG 210 will deregister trigger point identifiers for that CAP 212, and will therefore not receive queries for that CAP 212, as described below.

When the logical link between an RDG 210 and a CAP 212 is disestablished, the CIP 706 in the RDG 210 updates the registration bulletin board 708 to indicate that the CAP's trigger point identifiers are inactive. In a preferred embodiment, UDP is used to communicate with CAP 212.

Because UDP does not guarantee message delivery, the CIP 706 cannot use a lack of response from the CAP 212 to determine whether a logical link is established. Therefore, to determine whether a logical link is established, the CIP 706 sends a "heartbeat" message to the CAP 212 on a regular basis. A "heartbeat" message is a message sent over a link to a component on a regular basis to determine whether that component and link are still "alive." In a preferred embodiment, the heartbeat message is sent at the communications layer because the UDP layer may fail even if the link is established.

If the CIP 706 does not receive a response from the CAP 212 within a predetermined period of time, it inactivates CAP's trigger point identifiers on the registration bulletin board 708. The CIP 706 then tries a predetermined number of times to re-establish the logical link to the CAP 212.

When a trigger point identifier on the registration bulletin board 708 is inactivated, formatter 704 sends a message to DAP 208 to deregister the RDG 210 for that trigger point identifier. If all RDGs 210 associated with a DAP deregister for a trigger point identifier, the DAP will inactivate the trigger point in the call processing plan, and will use default routing for that call type.

Call Processing

When the DAP 208 reaches a trigger point during call processing, it finds an RDG 210 registered for the trigger point identifier, and sends a call processing query in a message to that RDG 210. At the RDG 210, the DIP 702 receives the query message and passes it to the formatter 704. The formatter 704 extracts the application data, builds a customer call processing query message, and passes the message to the appropriate CIP 706. In a preferred embodiment, the message format is ASN.1.

If TCAP messages are also to be supported, the formatter 704 first uses the trigger point identifier to query a host configuration file 716. The host configuration file 716 maintains the correspondence between trigger point identifiers and CAPs 212. For each trigger point identifier, host configuration file 716 specifies the CAP 212 that has registered for it, the IP network address for that CAP 212, the customer message format and customer protocol, and which CIP 706 to use to communicate with the CAP 212.

The formatter 704 then sets a timer. Formatter 704 sets a timer for each message passed to the CIP 706. This timer is used to time-out a response from the CAP 212, to ensure that the live call waiting at the switch 204 for call routing resolution is not held up for an extended period of time. In a preferred embodiment, the time budget allowed is as follows:

100 ms round trip between DAP 208 and RDG 210
200 ms total processing time within the RDG 210
250 ms round trip between RDG 210 and CAP 212; and
250 ms total processing time within the CAP 212.

This budget allows for a total time of 800 ms for the query message sent from the DAP 208 to be followed by a response message received by the DAP 208.

Thus in a preferred embodiment, the formatter 704 sets a timer of 500 ms when it sends a message to the CIP 706. This covers the round trip time between the RDG 210 and the CAP 212, and the total processing time at the CAP 212. If a response is not received by the expiration of the timer, the formatter 704 sends a message to the DAP 208 to use default routing. The formatter 704 tracks the status of all messages sent via a message status database 720. If a response is not received for a message sent, then the message sent is logged to a file of CAP outstanding messages 718 for later reference.

The CIP 706 sends the query message to the appropriate CAP 212 using the IP address for the CAP 212 provided by a CAP configuration file 717. CAP configuration file 717 stores and maintains data related to the configuration of CAPs 212. This data can include the trigger points for each CAP 212 and the mapping between CAPs 212 and CIPs 706. The CAP 212 processes the query and returns a response message. The CIP 706 receives and authenticates the response message. An example authentication process is described below.

When the CIP 706 receives a response message from a CAP 212, it authenticates the message and sends it to the formatter 704. The formatter 704 extracts the application data, which specifies a destination for call routing, from the ASN.1 or TCAP message. The formatter 704 then creates a call processing response in the carrier format used by the DAP 208. The formatter 704 then sends the call processing response to the DIP 702, which sends it via DECNet routing over the LAN 506 to the DAP 208.

Authentication

RDG 210 performs authentication for each message received from a CAP. Authentication ensures both that the message came from the correct sender (the CAP), and that the message was not altered.

When the CAP 212 has created a response message, it calculates and encrypts a checksum for the message. In a preferred embodiment, the checksum is created by performing an exclusive OR ("XOR") function on all bytes of the message. In a preferred embodiment, the checksum is encrypted using a Data Encryption Standard (DES) algorithm. Only the checksum portion of the message is encrypted. The message is then sent to the RDG 210.

At the RDG 210, the CIP 706 receives the message and performs its own checksum on the unencrypted portion of the message. The CIP 706 then decrypts the checksum in the message and compares the two checksums. If they match, the CIP 706 authenticates the message and sends it to the formatter 704. If they do not match, the CIP 706 drops the message; the response will likely time-out, in which case the formatter 704 sends a message to the DAP 208 to use default routing.

To perform encryption and decryption using DES, a private key must be shared between the RDG 210 and the CAP 212. The RDG 210 uses a key manager 710 to maintain an array of keys for each CAP 212. When a link is established to a CAP 212 and a trigger point identifier is registered, the CIP 706 sends a registration message for that CAP 212 to the key manager 710. The key manager 710 responds with key handling options for that CAP 212. These options can include the number of key slots, whether a same or different key will be used in each direction of communications, whether a same or different key will be used on each logical link established with the CAP, and the like. The key manager 710 also sends an array of the currently valid keys. As each session with a CAP 212 is established, a key is selected for use from those in the array. The key manager 710 can also send a key update message, which causes any active sessions using the specified key to be closed and restarted with a new key.

Other techniques for providing authentication can be employed without departing from the spirit and scope of the present invention, as would be apparent to one skilled in the relevant art.

Logger and Supervisor

A logger process 712 collects error and other messages from the formatter 704 and the CIP 706 during RDG execution, and writes them to an error and transaction message log 722. In a preferred embodiment, a distinct component is used for logger 712 because the formatter 704 and CIP 706 operate in real-time, and cannot afford the disk input/output functions needed. These error and transaction messages may be provided to an external monitoring and alarm system 724 for network management.

A supervisor process 714 manages the interprocess communications among the other process components, and is also responsible for startup and shutdown activities of the RDG 210.

Security

A key feature of the present invention is the multiple layers of security it provides. Since the RDG 210 is providing external access to a carrier's ICR systems, security is vital. In a preferred embodiment, the present invention provides security on the network, system, and application layers.

Network level security is provided by the IP routers 602 at the RDG 210 site. Use of address/port filtering on these routers 602, as is available on Cisco routers, ensures that only messages from approved IP addresses are passed through. This is a feature implemented on the ports of the IP Routers 602 that face the CAPs.

Network level security is also provided by network controllers at the RDG 210. Only IP protocol is enabled on the CAP-side network controllers of the RDG 210. Services that ride IP, such as file transfer protocol (FTP) and telnet, are turned-off at each port. This prevents any hostile access from using these services.

Network level security is also provided by using the RDG 210 as a distinct component separate from the DAP 208. This segregates the carrier's internal network, that provide s connectivity within and among the DAPs 208, from the external network that provides access for the CAPs 212.

System level security can be provided by implementing standard security features within VMS and from other vendors. There are many commercially-available security products that can be implemented on the operating system of the RDG 210. These provide the ability to audit trails of messages received, and trigger alarms based on suspicious patterns.

Application level security is provided by the authentication process performed by the CIP 706 on the messages received from a CAP 212. As described above, this process includes encrypting and decrypting the checksum of each message using DES. If the CIP's calculated checksum does not match the decrypted checksum performed by the CAP 212, an alarm is triggered and the message is not used.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described example embodiments, but should be defined only in accordance with the following claims and their equivalents.

What is claimed is:

1. A system for processing a call in a telecommunications network, comprising:

a first primary remote data gateway locally associated with a first data access point, said first primary remote data gateway operative to receive a call processing query from said first data access point at said locally associated remote data gateway, said call processing query including a request for call routing instructions;

means for translating said call processing query to a customer message format and customer protocol; and means for sending said translated call processing query to a customer access point for processing.

2. The method of claim 1, further including:

a back-up remote data gateway associated with said first data access point; said back-up remote data gateway configured in a hot cutover mode to provide continuity of processing of said call processing query in the event of a prime remote data gateway failure.

3. The system of claim 2, further comprising:

means for activating a trigger point in a call processing plan at said data access point when a link to said customer access point is established;

means for deactivating said trigger point when said link to said customer access point is disestablished; and means for using default routing for a call when processing for said call at said data access point reaches said trigger point and said trigger point is not activated.

4. The system of claim 3, further comprising:

means for sending a heartbeat message to said customer access point to determine whether said link has been disestablished; and means for attempting to reestablish said link when said link is determined to be disestablished.

5. A method for processing a call in a telecommunications network, comprising the steps of:

locally associating a first primary remote data gateway with a first data access point;

receiving a call processing query from said first data access point at said locally associated remote data gateway, said call processing query including a request for call routing instructions;

translating said call processing query to a customer message format and customer protocol; and sending said translated call processing query to a customer access point for processing.

6. The method of claim 5, further including the steps of:

associating a back-up remote data gateway with said first data access point; and configuring said back-up remote data gateway in a hot cutover mode to provide continuity of processing of said call processing query in the event of a prime remote data gateway failure.

7. The method of claim 6, further comprising the steps of:

activating a trigger point in a call processing plan at said data access point when a link to said customer access point is established;

deactivating said trigger point when said link to said customer access point is disestablished; and using default routing for a call when processing for said call at said data access point reaches said trigger point and said trigger point is not activated.

8. The method of claim 7, further comprising the step of:

sending a heartbeat message to said customer access point to determine whether said link has been disestablished; and attempting to reestablish said link when said link is determined to be disestablished.

* * * * *

UNITED STATES PATENT AND TRADEMARK OFFICE
CERTIFICATE OF CORRECTION

PATENT NO.    : 5,917,900
DATED         : June 29, 1999
INVENTOR(S)   : Allison et al.

It is certified that error appears in the above-identified patent and that said Letters Patent is hereby corrected as shown below:

<u>Title page,</u>
Item [75], Inventors, please delete "Jeffrey E. Allison, Sr." and print -- Jeffery E. Allison, Sr. --

Signed and Sealed this

Seventh Day of January, 2003

JAMES E. ROGAN
*Director of the United States Patent and Trademark Office*